US009511858B2

(12) United States Patent
Fisher et al.

(10) Patent No.: US 9,511,858 B2
(45) Date of Patent: Dec. 6, 2016

(54) INVERTED-LANDING AIRCRAFT

(75) Inventors: Christopher E. Fisher, Simi Valley, CA (US); Thomas Robert Szarek, Oak Park, CA (US); Justin B. McAllister, Simi Valley, CA (US); Pavel Belik, Simi Valley, CA (US)

(73) Assignee: AeroVironment, Inc., Simi Valley, CA (US)

( * ) Notice: Subject to any disclaimer, the term of this patent is extended or adjusted under 35 U.S.C. 154(b) by 0 days.

(21) Appl. No.: 13/261,813

(22) PCT Filed: Aug. 16, 2012

(86) PCT No.: PCT/US2012/000356
§ 371 (c)(1),
(2), (4) Date: Aug. 1, 2014

(87) PCT Pub. No.: WO2013/062608
PCT Pub. Date: May 2, 2013

(65) Prior Publication Data
US 2014/0350748 A1   Nov. 27, 2014

Related U.S. Application Data

(60) Provisional application No. 61/575,418, filed on Aug. 19, 2011.

(51) Int. Cl.
*B64C 39/02* (2006.01)
*G05D 1/08* (2006.01)
*G05D 1/06* (2006.01)

(52) U.S. Cl.
CPC ........... *B64C 39/024* (2013.01); *G05D 1/0676* (2013.01); *G05D 1/0808* (2013.01);

(Continued)

(58) Field of Classification Search
CPC .................. B64C 39/02; G05D 1/08
USPC ....... 701/2, 3, 4, 11, 16; 340/183, 190, 75.1, 340/76 R
See application file for complete search history.

(56) References Cited

U.S. PATENT DOCUMENTS 2,797,881 A   7/1957 Andrews
3,784,969 A   1/1974 Wilckens et al.
(Continued)

FOREIGN PATENT DOCUMENTS

WO   WO2006/059324   *   6/2006 ............ B64C 91/18
WO   WO 2006/059324 A1   6/2006

OTHER PUBLICATIONS

Clayton Moore, Craig Hosking Brings Aerial Thrills to Hollywood, Jan. 2007, Airport Journal.*

(Continued)

*Primary Examiner* — Tan Q Nguyen
(74) *Attorney, Agent, or Firm* — Eric J. Aagaard, Esq.; The Law Office of John A. Griecci

(57) ABSTRACT

An aircraft defining an upright orientation and an inverted orientation, a ground station; and a control system for remotely controlling the flight of the aircraft. The ground station has an auto-land function that causes the aircraft to invert, stall, and controllably land in the inverted orientation to protect a payload and a rudder extending down from the aircraft. In the upright orientation, the ground station depicts the view from a first aircraft camera. When switching to the inverted orientation: (1) the ground station depicts the view from a second aircraft camera, (2) the aircraft switches the colors of red and green wing lights, extends the ailerons to act as inverted flaps, and (3) the control system adapts a ground station controller for the inverted orientation. The aircraft landing gear is an expanded polypropylene pad located above the wing when the aircraft is in the upright orientation.

15 Claims, 9 Drawing Sheets

(52) U.S. Cl.
CPC ....... *G05D1/0816* (2013.01); *B64C 2201/021* (2013.01); *B64C 2201/104* (2013.01); *B64C 2201/127* (2013.01); *B64C 2201/146* (2013.01); *B64C 2201/18* (2013.01)

(56) References Cited

U.S. PATENT DOCUMENTS

| | | | |
|---|---|---|---|
| 4,261,533 A | 4/1981 | Roberts et al. | |
| 5,716,032 A * | 2/1998 | McIngvale | 244/185 |
| 5,999,865 A * | 12/1999 | Bloomquist et al. | 701/25 |
| 6,181,989 B1 * | 1/2001 | Gwozdecki | 701/4 |
| 6,367,738 B1 * | 4/2002 | Wadleigh | 244/13 |
| 7,530,527 B2 * | 5/2009 | Kelleher | 244/2 |
| 7,908,044 B2 * | 3/2011 | Piasecki et al. | 701/4 |
| 7,999,698 B2 * | 8/2011 | Annati et al. | 340/945 |
| 8,123,162 B2 | 2/2012 | Sirkis | |
| 2001/0021888 A1 * | 9/2001 | Burns et al. | 701/23 |
| 2002/0143461 A1 * | 10/2002 | Burns et al. | 701/117 |
| 2010/0198514 A1 * | 8/2010 | Miralles | 701/302 |
| 2010/0282897 A1 * | 11/2010 | de la Torre | 244/49 |
| 2012/0035798 A1 * | 2/2012 | Barfoot et al. | 701/25 |
| 2012/0116666 A1 * | 5/2012 | Makela | 701/400 |
| 2013/0054133 A1 * | 2/2013 | Lewis et al. | 701/423 |

OTHER PUBLICATIONS

S. Clayton Moore, "Craig Hosking Brings Aerial Thrills to Hollywood," Airport Journals, Jan. 2007.

* cited by examiner

INVERTED-LANDING AIRCRAFT

This application claims the benefit of U.S. Provisional Application No. 61/575,418, filed Aug. 19, 2011, which is incorporated herein by reference for all purposes.

The present invention relates to an aircraft configured to fly in an upright orientation and land in an inverted orientation.

BACKGROUND OF THE INVENTION

Unmanned aerial vehicles (UAVs) have been developed for a large array of tasks. One such UAV task is for aerial reconnaissance. In UAV reconnaissance aircraft, a payload consisting of one or more cameras, and possibly one or more gimbaled supports for the cameras, might preferably extend below the fuselage and/or wing of the aircraft for maximum unimpeded viewing during flight. This configuration potentially puts the cameras and gimbals in harm's way during landing, particularly for payloads that are sensitive to high vibration and impact loads.

Larger UAVs tend to have a significant range (distance they can travel), and are typically provided with standard aircraft take-off and landing facilities. These aircraft do not typically have to take off and land in combat settings in which the visual exposure of the ground crew may be life threatening. Moreover, larger UAVs are naturally required to have landing gear configurations that are structurally size appropriate to their aircraft, which may be significantly larger than the payload size requirements for a reconnaissance payload. Thus, the landing gear configuration for larger UAVs tends to be such that the payload is structurally supported and protected during landing. Moreover, the cost of such an aircraft is generally large in comparison to the cost of its payload, so the payload may be made structurally tolerant without significantly increasing the overall cost of the combined aircraft and payload.

Smaller UAVs are often used in military field situations, in which little or no room is available for rolling landings, and in which precision landings are important to limit the exposure of field personnel to enemy fire. Precision landings are also useful when attempting to land the aircraft in a limited location such as a rooftop. Likewise, in civilian applications, similar needs may be found in urban settings for which only a limited ground space is controlled during an emergency situation, such as near a burning building. For smaller UAVs, a number of adaptations have been used to protect low-hanging payload integrity during landing. One adaptation is to use payloads having high structural integrity (such as using only sturdy, non-gimbaled cameras) to provide for payloads that are tolerant to the high vibration and impact loads that occur when the payload strikes the ground.

For example, the Raven® UAV, with a wingspan over 4 feet, provides low-altitude surveillance and reconnaissance intelligence for both military and commercial applications. Such an aircraft can be configured with a cushioned landing pad (in place of landing gear) that allows provide for an extremely short-field landing (at the expense of much higher landing loads). The relatively accurate short field landing capability does help protect ground crews from the possible dangers of open exposure (e.g., in military situations).

This aircraft may also be equipped with a payload of a group of robust stationary cameras that can handle the high landing loads. Nevertheless, high resolution cameras of such structural integrity can be very expensive. Given that smaller UAVs are significantly less expensive that large UAVs, providing a group of highly expensive cameras to a small UAV can add significantly to the cost of the aircraft. Alternatively, such an aircraft can be configured with the entire payload being gimbaled not only for a wide field of viewing, but also such that it swings up into the fuselage prior to landing. While this may be effective to reduce the landing loads on the payload, the gimbal mechanism adds significant weight, and the need to fit it within the fuselage limits the size and shape of the payload.

Another known adaptation for smaller UAVs is to use a parachute to land the aircraft. In such a maneuver, the engine is stopped and the parachute is deployed while the aircraft is in the general vicinity of the desired landing location. Moreover, the parachute can be attached to the bottom of the aircraft to provide for the aircraft to land not on its lower surface, but rather on its upper surface (which can include landing struts to support the vehicle during a vertical-decent landing). If the timing of such a deployment is accurate, the winds are cooperative, and the parachute both successfully deploys and successfully inverts the aircraft without tangling in part of the aircraft structure, then a landing within a limited field location with limited landing loads might be possible.

Nevertheless, this involves surrendering flight control once a parachute is deployed, and thus greatly reduces the likelihood of a precise landing location. Also, a parachute landing is also difficult to "call-off" if landing the aircraft is no longer desired, the landing trajectory is incorrect, or the landing site is no longer cleared. Such issues could be extremely important in a situation where landing location is important, such as needing to land an aircraft on a rooftop or near a protected enclosure for ground personnel. Moreover, the skill level required to properly estimate a landing location in situations of varying wind speed and direction conditions might be higher than the skill level otherwise required for use of the aircraft.

Accordingly, there has existed a need for an unmanned vehicle capable of accurate landings with a load sensitive payload that extends significantly from the bottom of the aircraft. Preferred embodiments of the present invention satisfy these and/or other needs, and provide further related advantages.

SUMMARY OF THE INVENTION

In various embodiments, the present invention solves some or all of the needs mentioned above, providing a system providing for inverted landing of an unmanned aircraft. The aircraft includes a wing having an upper surface and a lower surface defining an upright orientation for normal aircraft flight and an inverted orientation for inverted flight. The upper surface is gravitationally above the lower surface while in the upright orientation, while the lower surface is gravitationally above the upper surface while in the inverted orientation. The system includes a remote-control station and a remote-control control system. The control system is configured for a user to remotely control the flight of the aircraft using the remote-control station.

Advantageously, the remote-control station is provided with an auto-land function that instructs the control system to operate the control surfaces such that the aircraft conducts an inverting maneuver in which the aircraft rotates from the upright orientation to the inverted orientation. In the inverted orientation, the aircraft can be landed without causing ground-cintact damage to delicate payloads that hang down from the aircraft when in the upright orientation.

The invention further features a first camera oriented to view downward and forward while the aircraft is in the upright orientation, and a second camera oriented to view downward and forward while the aircraft is in the inverted orientation. Advantageously, the control system is configured to relay images from the first camera to the remote-control station while the aircraft is in the upright orientation, and to relay images from the second camera to the remote-control station while the aircraft is in the inverted orientation. Likewise, the remote-control station is configured to display the relayed images from the first camera to the user during flight in the upright orientation, and is further configured to display the relayed images from the second camera to the user during flight in the inverted orientation. Thus, the remote-control station is always showing a downward and forward looking view towards the landing location.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

Figure 1:
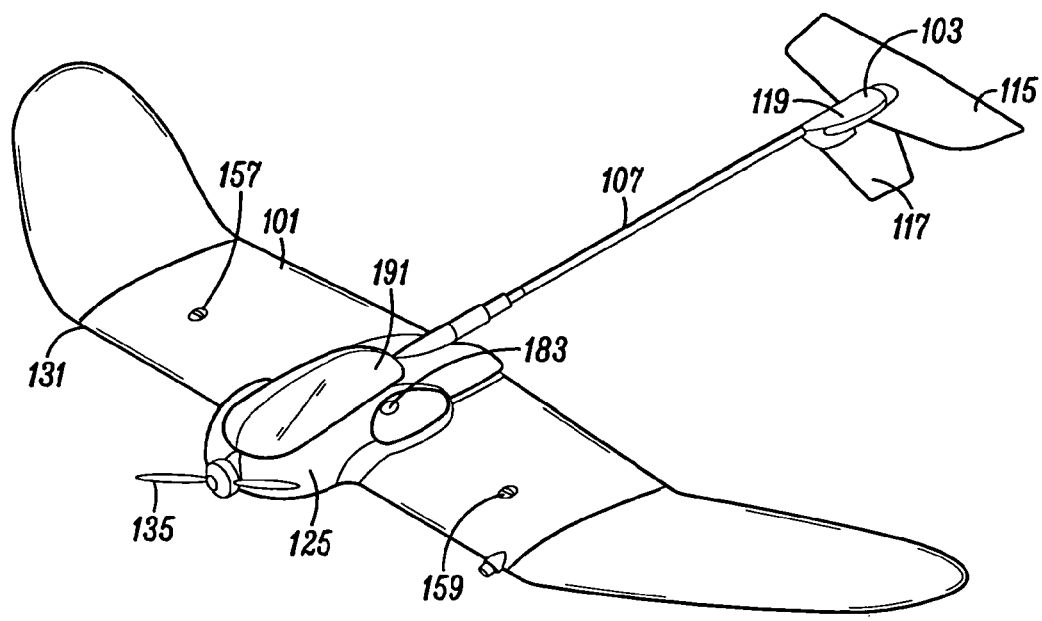
FIG. 1 is a perspective view of an aircraft embodying the present invention.
Figure 2:
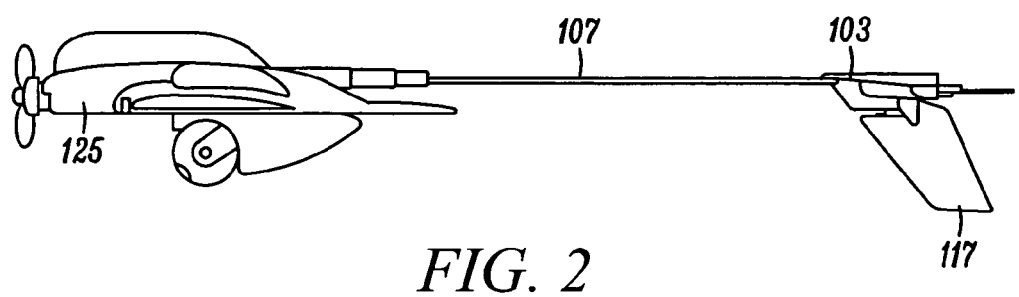
FIG. 2 is a right side view of the aircraft depicted in FIG. 1, in an upright orientation.
Figure 3:
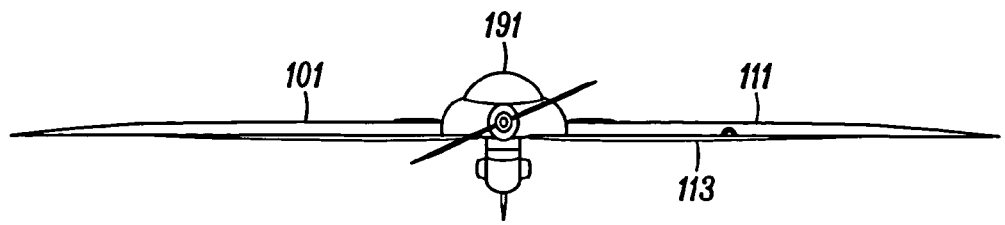
FIG. 3 is a right side view of the aircraft depicted in FIG. 1.
Figure 4:
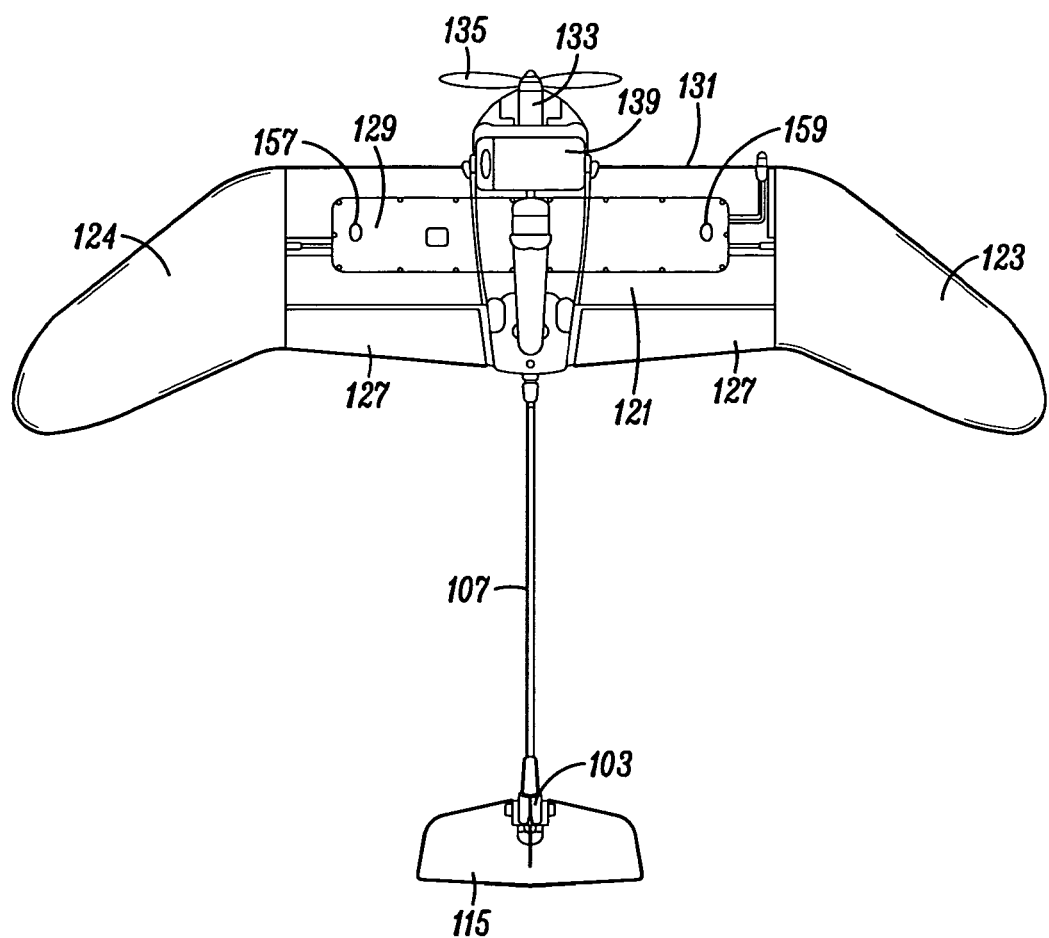
FIG. 4 is a bottom view of the aircraft depicted in FIG. 1.
Figure 5:
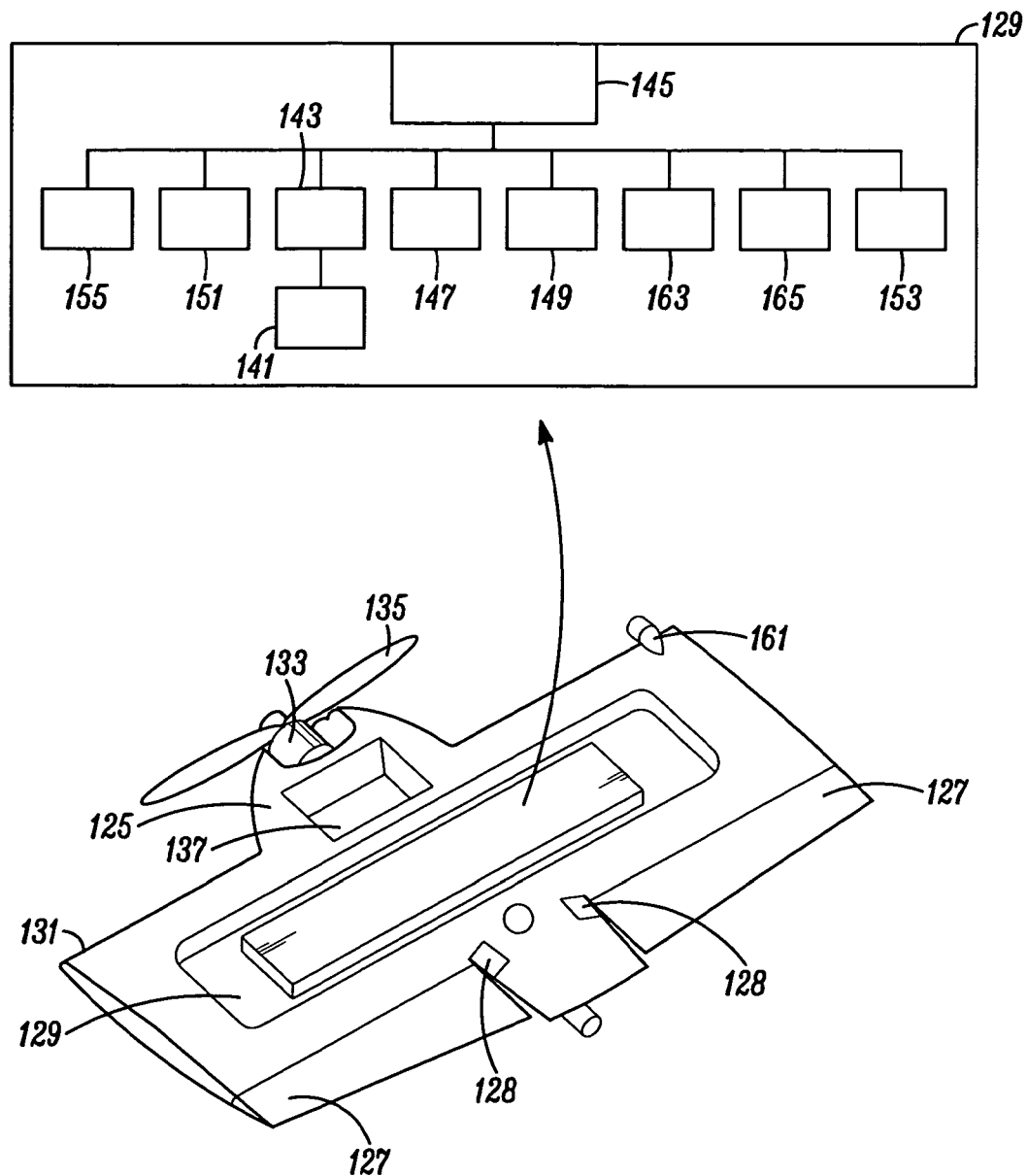
FIG. 5 is a bottom perspective view of a wing center section and thrust module of the aircraft depicted in FIG. 1, having a battery and a control module cover removed.
Figure 6:
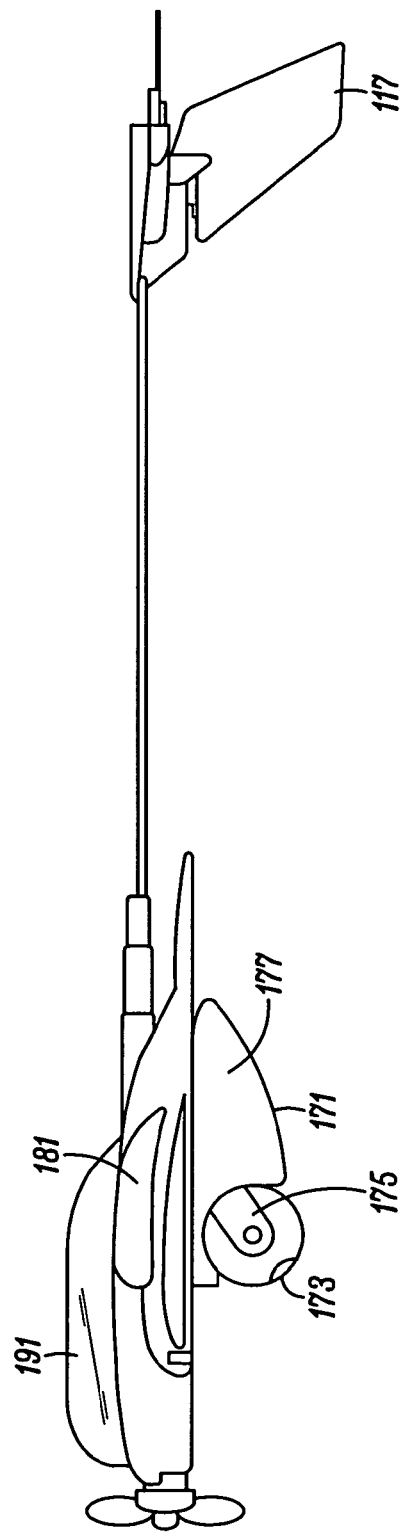
FIG. 6 is an enlarged view of FIG. 2.

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them. Furthermore, there is no intent to be bound by any expressed or implied theory presented in this application.

Typical embodiments of the present invention reside in an unmanned aerial vehicle ("UAV") (i.e., an unmanned aircraft system) including a UAV configured to invert prior to landing, and then go in to a controllable stalled flight condition that provides for rapid but controlled descent.

UAV Aircraft

With reference to FIGS. 1 to 4, a first embodiment of an aircraft under the invention is configured with a wing 101 connected to an empennage 103 by a fuselage including a tail-boom comprised primarily of a slender shaft 107 extending between the wing and empennage. The wing has an upper surface 111 and a lower surface 113 that define the camber of the wing and an upright (flying) orientation of the aircraft for normal aircraft flight. With the wing in the upright orientation, the upper surface faces gravitationally upward and is gravitationally above the lower surface, and the lower surface faces gravitationally downward. The upper and lower wing surfaces further define an inverted (flying) orientation for inverted aircraft flight, in which the lower surface faces gravitationally upward and is gravitationally above the upper surface, and the upper surface faces gravitationally downward.

The camber is chosen to be an airfoil that can operate relatively efficiently (as compared to other airfoils) in the upright orientation, and that is not highly unstable in the inverted orientation. The selection of such an airfoil can be made by a person skilled in the art using experimentation or analytical methods.

The empennage 103 has an elevator 115 (i.e., a horizontal control surface) and a rudder 117 (i.e., a vertical control surface), the deflection of which are controlled by servos on a slender, base section 119 of the empennage. Rather than extending upward, the rudder extends downward from and below the base section, elevator and fuselage when the aircraft is in the upright orientation. It should be noted that with this embodiment in the upright orientation, the elevator would likely strike the ground if the aircraft were to land.

While the elevator 115, rudder 117 and base section 119 substantially comprise the complete empennage in this embodiment, an embodiment also having rigid horizontal and vertical stabilizers are within the scope of the invention. In the case of the vertical stabilizer, it will likely extend downward from and below the base section, elevator and fuselage, just as the rudder does.

The wing 101 includes a center section 121 and two laterally extending tip sections including a port tip section 123 and a starboard tip section 124. It should be noted that in this application, the terms starboard and port refer to the right and left hand sides of the wing (and more broadly, of the aircraft), respectively, when the plane is in the upright orientation, as it is commonly understood for aircraft. For the purposes of this application, it should be understood that inverting the aircraft does not alter which physical portion of the wing is on the port side and which physical portion of the wing is on the starboard side.

With reference to FIGS. 1-5, mounted on the center section 121 are a thrust module 125, two ailerons 127 configured to be actuated by servos 128 at inboard ends of the ailerons, and a control module 129. The control module forms a single, watertight compartment covered by a control module cover, and that holds most of the electronics necessary for flying the aircraft. While this embodiment includes common types of control surfaces (e.g., ailerons 127, an elevator 115 and a rudder 117), it should be understood that the use of other, less common types of control surfaces (e.g., canards and ruddervators) are within the scope of the invention.

Extending forward from a leading edge 131 of the wing 101, the thrust module 125 forms a support structure holding a motor 133 configured to drive a propeller 135 in rotation to provide thrust for the aircraft. The thrust module also forms a battery cavity 137 configured to hold a battery 139 for powering the aircraft. Power is controllably provided to the motor by the battery, and motor operation is controlled via electrical leads extending from the control module 129.

Included within the control module 129 are GPS antennas 141, a GPS receiver 143, a user interface 145, a video processing unit 147, a miniature digital data link 149 ("DDL," i.e., a lightweight and low-power broadband digital network node that enables enhanced command and control of small unmanned aircraft systems), an inertial measurement unit 151 ("IMU"), and various communication equipment configured for transmitting and receiving communication signals. Also included within the control module are two beacon boards, including a port beacon board 153 on the port side of the wing, and a starboard beacon board 155 on the starboard side of the wing.

The beacon boards are provided with navigation lights including a starboard light 157 connected to the starboard beacon board 155 on the starboard side of the wing, and a port light 159 connected to the port beacon board 153 on the on the port side of the wing. These navigation lights are configured to be visible both on the upper and lower surfaces of the wing. This may be accomplished using a single light located between transparent surfaces on the upper and lower surfaces of the wing, or using separate, upper and lower lights for each side of the wing. Each of the navigation lights are configured to controllably emit at least two different colors of light, which will typically be green and red.

The center section is further provided with other devices useful for the operation of civilian and/or military unmanned aircraft, such as a pitot tube 161, a dipole antenna 163, an analog uplink or connection for a selective availability anti-spoofing module ("SAASM") key 165, which provides for secure reception of the U.S. military's precise positioning service. The pitot tube is preferably configured for operation in a wide variety of whether conditions, including rain.

With reference to FIGS. 1-6, extending down from the wing 101 is a payload including a first camera system 171. This camera system is configured with a high resolution infrared/electro optical camera 173 supported on a gimbal 175 that is driven by one or more motors in a camera servo system 177. This payload extends gravitationally below the wing (and fuselage) while the aircraft is in the upright orientation, and typically, below all other parts of the aircraft, except perhaps the rudder 117. Like the rudder, in the upright orientation the payload might strike the ground if the aircraft were to land. The camera system is controllable to look in different directions using the gimbal. Nevertheless, it is configured such that it can view downward and forward while the aircraft is in the upright orientation. Thus, the first camera system making operate as a first, upright-orientation flight camera. This first camera is configured to support visual flight control of the aircraft while it is flying in the upright orientation.

Alternatively, (or in addition to a payload camera) the aircraft could have a fixed, first, upright-orientation camera oriented to look downward and forward while the aircraft is in the upright orientation. In either case, this first camera is configured to support visual flight control of the aircraft while it is flying in the upright orientation. Such a fixed, first, upright-orientation flight camera allows for the use of payloads that do not have a camera configured to support visual flight control of the aircraft, or for the gimbaled camera to be used in directions that would not support flight control by a user.

Embedded in the fuselage or wing 101 is a second camera system 181 including a second, inverted-orientation camera 183 oriented to look downward and forward while the aircraft is flying in the inverted orientation. This second camera system is configured to support visual flight control of the aircraft while it is flying in the inverted orientation, and more particularly, to support controlled descent while landing in the inverted orientation.

The aircraft includes landing gear 191. Rather than being located for landing in an upright orientation (as is known), the landing gear is located and positioned with respect to the fuselage and wing 101 such that the landing gear is useful for landing the aircraft while the aircraft is in the inverted orientation.

For the purposes of this application the term landing gear should be broadly construed to cover structures configured to impact the ground during landing. For this embodiment, the landing gear 191 is an expanded polypropylene pad located gravitationally above the wing 101 and payload (i.e., the first camera system 171) when the aircraft is flying in the upright orientation. The pad provides a significant level of cushioning upon impact, and provides for the aircraft to come to rest quickly upon landing. It should be understood that other, more standard types of landing gear (such as wheels or landing struts) that are located and positioned for landing the aircraft while inverted are within the scope of the invention.

It is noteworthy that the payload, and particularly the first camera system 171 extends gravitationally below the wing 101 and landing gear 171 while the aircraft is in the upright orientation, providing the payload with clear line-of-sight viewing and/or targeting in many directions. The landing gear being located and positioned for landing the aircraft while inverted allows for the payload to be out of harm's way during the landing, and provides for the landing gear and aircraft structure to cushion the shock of landing for the payload. Thus, the payload, which might be a very expensive component of the aircraft system, is well protected.

Remote-Control Station

Figure 7:
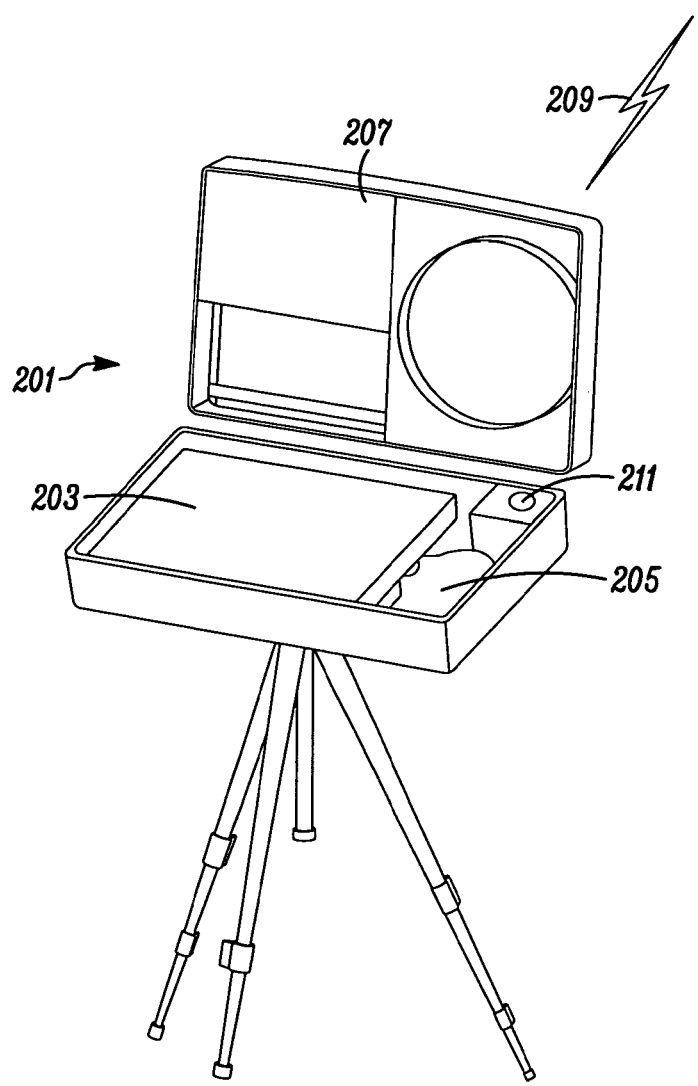
FIG. 7 is a perspective view of a remote-control station that is part of an aircraft system including the aircraft depicted in FIG. 1.

With reference to FIG. 7, the aircraft system further includes a remote-control station 201, which will typically, but not necessarily, be used by a user/pilot on the ground (e.g., a ground station). Other possible user/pilot locations include a boat or a plane.

The remote-control station 201 is configured for the user/pilot to remotely control the aircraft. More particularly, the remote-control station includes a video monitor 203 for displaying both flight control information (as is known for aircraft) and a live video feed from the aircraft to provide for visual flight, particularly for when the aircraft is not in view of the user. The remote control station further has a manual controller 205 to control the various aircraft features and functions. Optionally, this controller may be of a type similar to those known for video gaming such that the operation of the aircraft might be more quickly learned by user/pilots familiar with video game controls.

To provide communication with the aircraft, the remote-control station is provided with communication equipment 207 configured for the transmission and receipt of communication signals 209. As was previously described, The aircraft is also provided with communication equipment configured for the transmission and receipt of the communication signals, and thus the remote-control station is provided with two-way communication with the aircraft. These communication signals may include flight control information and commands, and payload related signals.

System Control System

Figure 8:
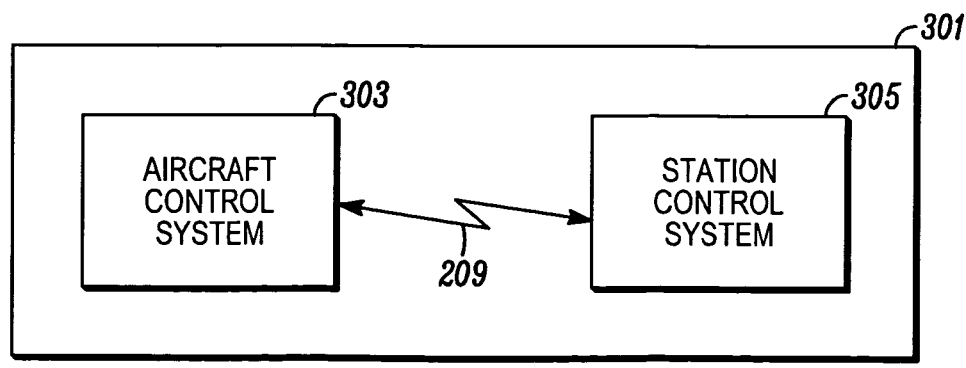
FIG. 8 is a schematic view of an aircraft system control system for the aircraft system including the aircraft depicted in FIG. 1 and the remote control station depicted in FIG. 7.

With reference to FIGS. 7 & 8, the aircraft system, including both the aircraft and the remote-control station 201, is provided with a system control system 301 configured for a user to remotely control the flight of the aircraft using the remote-control station. The system control system includes an aircraft control system 303 that includes the hardware and software within the aircraft, and a station control system 305 that includes the hardware and software within the remote-control station. The aircraft control system and station control system communicate with each other using the communication signals 209 that the aircraft and remote-control station are equipped to transmit and receive.

The station control system 305 is provided with an auto-land button 211 that activates an auto-land function. The auto-land button may be accessible to the remote-control station user as a physical button (as depicted), or an-onscreen button (such as one that can be pressed/activated using a mouse or a finger on a touchscreen). When the auto-land button is activated by the user, the auto-land function provides for the station control system to send an auto-land communication signal or set of signals that cause the aircraft control system 303 to deflect the control surfaces of the aircraft such that the aircraft enters and performs an inverting maneuver in which the aircraft rotates from the upright orientation to the inverted orientation. This occurs in an automated manner without further intervention by the user.

Figure 9:
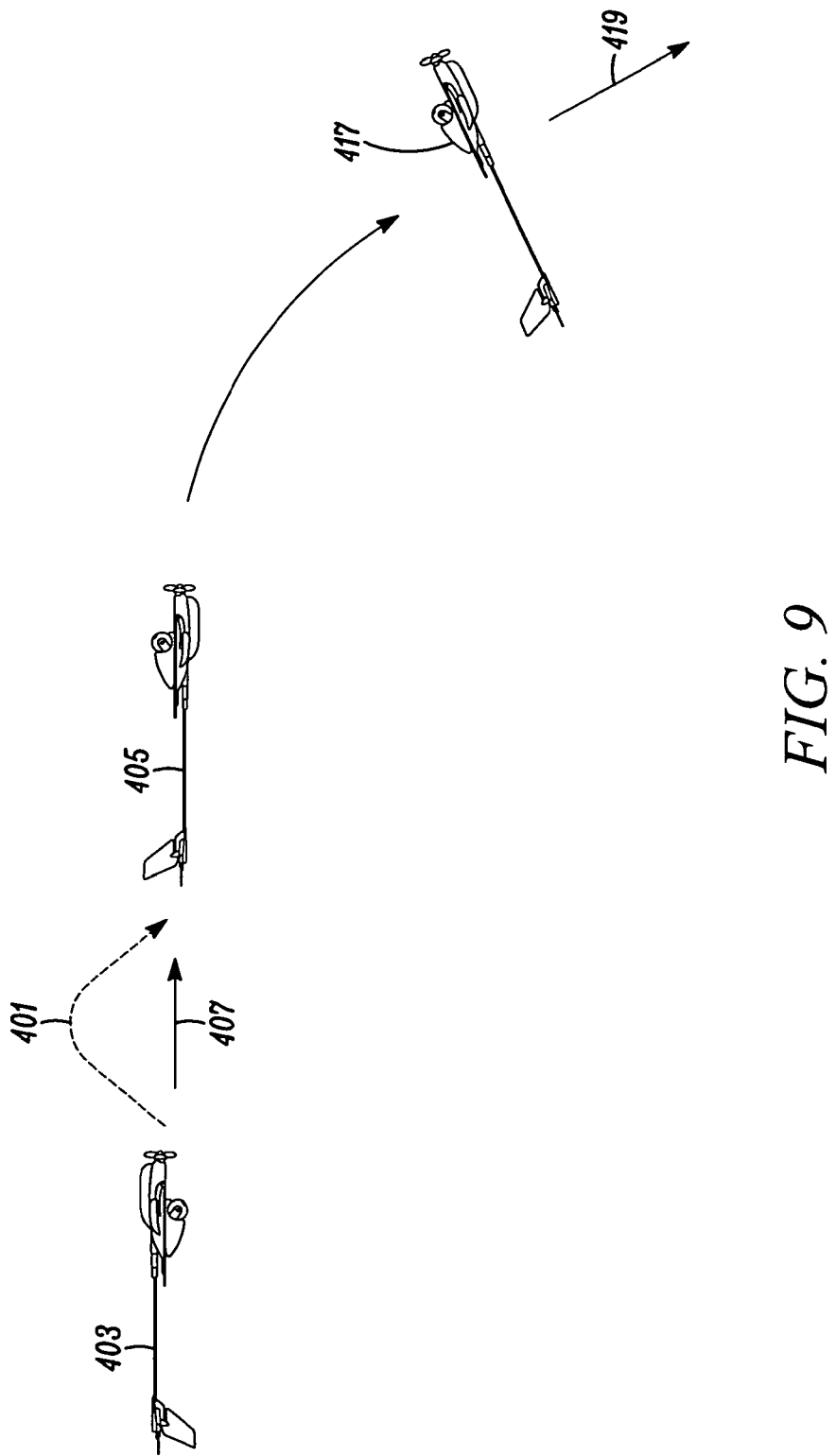
FIG. 9 is a time varying depiction of a first variation of a landing maneuver for the aircraft system.
Figure 10:
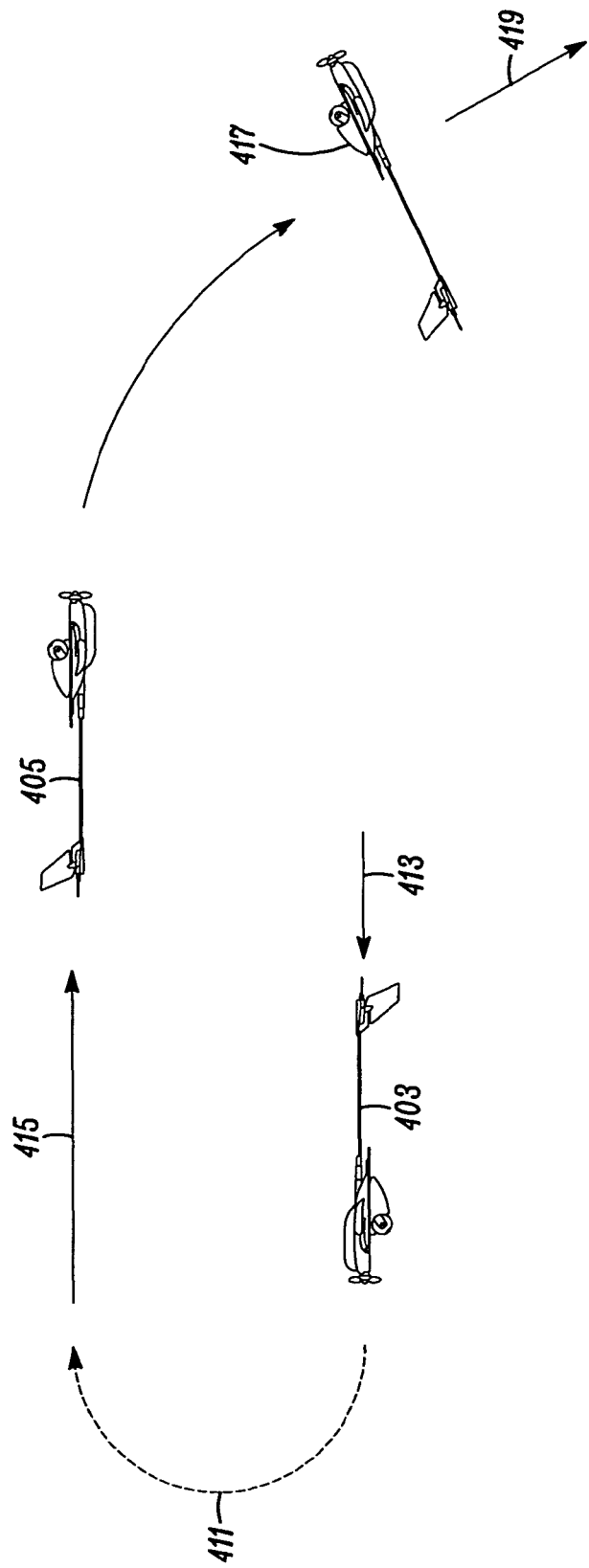
FIG. 10 is a time varying depiction of a second variation of a landing maneuver for the aircraft system.
Figure 11:
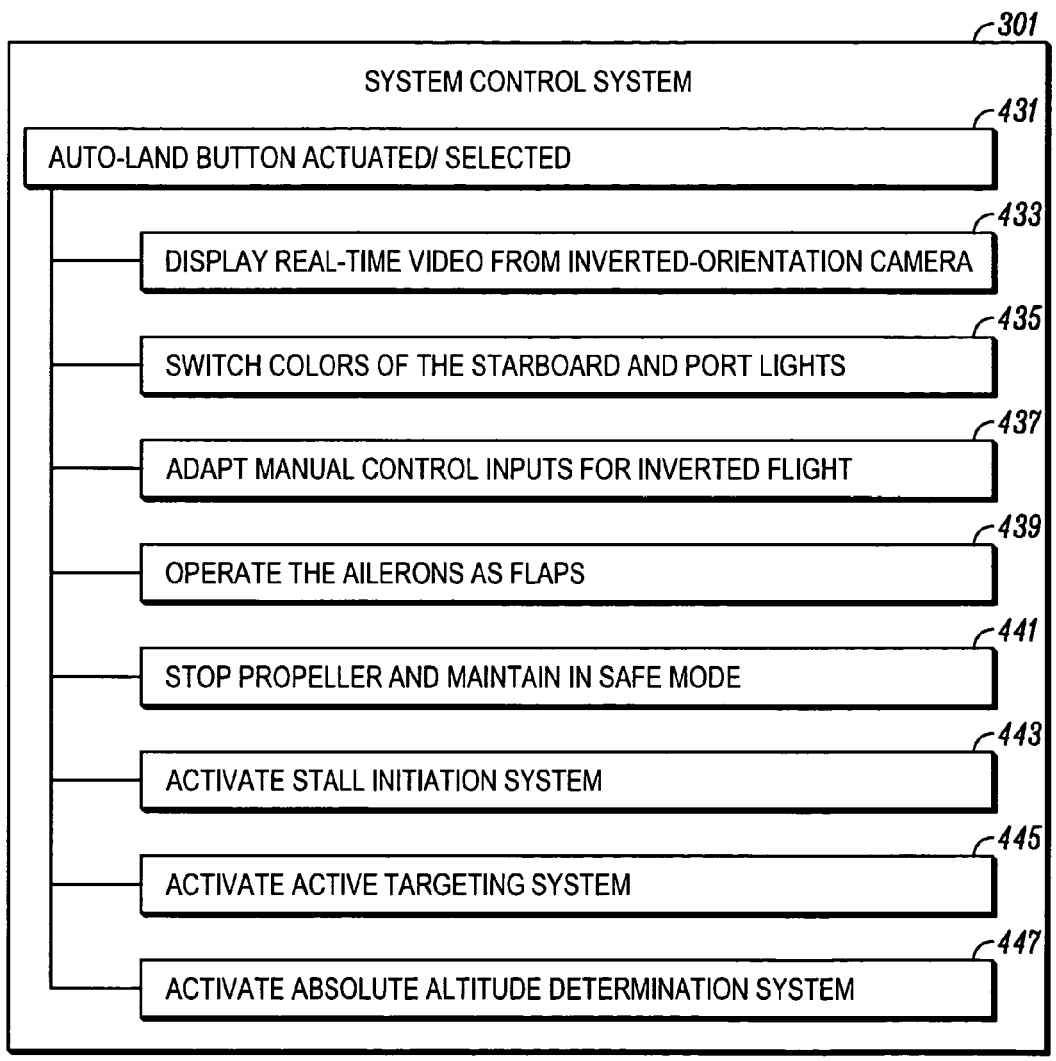
FIG. 11 is a schematic view of functions carried out by the aircraft system control system depicted in FIG. 8.

The inverting maneuver may be any of a plurality of known inversion maneuvers. With reference to FIG. 9, for example, the inversion maneuver may be a 180 degree roll 401 of the aircraft from the upright orientation 403 to the inverted orientation 405. In this maneuver, the aircraft will continuously fly in relatively the same direction 407. With reference to FIG. 10, as another example, the inversion maneuver may be a 180 degree pitching maneuver 411 of the aircraft (i.e., one half of an upward or downward loop) from the upright orientation 403 to the inverted orientation 405. In this maneuver, the aircraft will start flying in a first direction 413 and end up flying in substantially the opposite direction 415. The pitching maneuver might be more complicated to use for a user wanting to land the aircraft in a specific location (as they will have to overshoot that location), but it may have applications in which it is preferable. Optionally, the user will have the option of which type of maneuver to use, either by selecting from one of two auto-land buttons, or from having a default maneuver form and the ability to override the default form before selecting the auto-land button.

With reference to FIGS. 1-11, during inverted flight (i.e., while flying in the inverted orientation), the system control system changes the operation of the aircraft system as compared to its operation during normal, upright flight (i.e., while flying in the upright orientation). These changes may be initiated just prior to or during the transition from the upright orientation to the inverted orientation, or subsequently to that transition. These changes provide for a simple and seamless transition between the two orientations from the standpoint of the user. Typically these changes will occur, either directly or indirectly in response to the auto-land button being actuated (i.e., physically or electronically selected) 431 (and/or the auto-land function being otherwise activated, such as by reaching the end of available power for flight).

A first of the aircraft system operational changes in response to inverted flight pertains to monitoring visual flight references. During upright flight the first, upright-orientation camera is oriented to view downward and forward, while the second, inverted-orientation camera is pointed upward and forward. The system control system 301 is configured such that, while the aircraft is in the upright orientation, the aircraft control system is configured to relay real-time video images from the first, upright-orientation camera 173 to the remote-control station, and the station control system is configured to display on the monitor 203 the relay real-time video images from the first, upright-orientation camera to the user so that the user may use the images for visual flight.

During inverted flight the second, inverted-orientation camera 183 is oriented to view downward and forward, while the first, upright-orientation camera is pointed upward and forward. The system control system is configured such that, while the aircraft is in the inverted orientation, the aircraft control system is configured to relay real-time video images from the second, inverted-orientation camera to the remote-control station, and the station control system is configured to display 433 on the monitor 203 the relay real-time video images from the second, inverted-orientation camera to the user so that the user may use the images for visual flight.

It should be noted that the change from displaying the first camera image to the second camera image may be accomplished in a number of ways. For example, the aircraft control system 303 may change the transmission of images to be from the upright-orientation camera 173 to the inverted-orientation camera 183, either in response to receiving a communication signal 209 indicating the auto-land button 211 has been activated (and/or the auto-land function was activated), or in response to directly sensing that the aircraft was in the inverted orientation. Alternatively, the aircraft control system could continuously transmit images from both the first and second cameras, while the station control system could change the display of images to be from the upright-orientation camera to the inverted-orientation camera, either in response to the auto-land button having been activated (and/or the auto-land function having been activated), or in response to a communication signal from the aircraft control system indicating that the aircraft was in the inverted orientation.

In another variation of this change, the station control system 301 may be configured to display a plurality of video image feeds. For example, a first image display area on the monitor 203 might be a flight-control display, while a second image display area on the display might be a mission-related image feed. This could be used, for example, when using an upright orientation camera that is different from the payload camera, or when it is desirable to use the second camera to look upward in upright flight (such as when flying under a bridge and wanting to inspect the underside of the bridge). In these cases, the inversion of the aircraft will cause the system control system to change the camera image feed that is displayed in the flight control display.

As previously noted, the starboard light 157 and port light 159 each have the capability to emit two different colors of light, preferably being green and red. A second of the aircraft system operational changes in response to inverted flight pertains to the navigation lights. During upright flight, under the direction of the aircraft control system 303, the starboard light emits the first color (e.g., green), while the port light emits the second color, e.g., red. These colors are viewable from both above and below their respective sides of the wing. This color scheme conforms to traditional flight (and nautical) standards. Nevertheless, during inverted flight, under the direction of the aircraft control system 301, the colors are switched 435 such that the starboard light emits the second color (e.g., red), while the port light emits the first color, e.g., green. As with the flight control images, it should be noted that the timing and initiation of the change in colors may be accomplished based upon the receipt of a communication signal indicating the auto-land button has been activated (and/or the auto-land function has been activated), or in response to directly sensing that the aircraft is in the inverted orientation.

As should be apparent, this change provides for observers (including the user) to be able to correctly judge the direction of travel after the aircraft has reached the inverted orientation. As was previously indicated, the starboard and port lights might be implemented using separate lights on the upper and lower surfaces of the wing. In a variation of this aspect particular aspect of the invention, only the lights on the gravitational bottom of the wing are illuminated. Thus, under the control of the aircraft control system, only the lights on the lower surface of the wing are illuminated during upright flight, while only the lights on the upper surface of the wing are illuminated during inverted flight. It should be noted that this is still within the scope of a system in which a starboard light and a port light each have the capability to emit two different colors of light, as both the starboard light and port light each has two parts, one being on the lower surface and one being on the upper surface.

As previously noted, the aircraft includes a set of one or more control surfaces (e.g., ailerons 127, an elevator 155 and a rudder 117) configured to control the flight of the aircraft. A third of the aircraft system operational changes in response to inverted flight pertains to control surface actuation. During upright flight, in response to user input, the station control system transmits communication signals to the aircraft control system, which in turn controls the one or more control surfaces in known protocols for aircraft flight control. For example, while the aircraft is in the upright orientation, when the user actuates the controller to get the aircraft to pitch up, the aircraft control system rotates the trailing edge of the elevator upward with respect to the upper surface of the wing in order to pitch the aircraft gravitationally upward. Likewise, while the aircraft is in the upright orientation, when the user actuates the controller to get the aircraft to yaw left, the aircraft control system rotates the trailing edge of the rudder to the port side.

During inverted flight the system control system 301 (either in the aircraft control system 303 or the station control system 305) alters the control of some of the control surfaces with respect to the user inputs to present to the user an unchanged flight control experience. More particularly, the system control system is configured to adapt the operation of the control surfaces 437 with respect to manual inputs on the controller 205 such that a user of the controller does not need to adapt use of the controller based on the orientation of the aircraft. For example, in response to a pitch upward manual input while the aircraft is in the inverted orientation, the aircraft control system rotates the trailing edge of the elevator downward with respect to the upper surface of the wing (i.e., gravitationally upward) in order to pitch the aircraft gravitationally upward. Likewise, in response to a yaw left input while the aircraft is in the inverted orientation, the aircraft control system rotates the trailing edge of the rudder to the starboard side in order to yaw the aircraft to the left with respect to its flight direction. Both of these motions are reversed over the upright-orientation variations.

As was previously described, the timing of this change in control surface movement may be accomplished based upon the generation or receipt of a communication signal 209 indicating the auto-land button has been activated (and/or the auto-land function has been activated), or in response to a direct sensing that the aircraft is in the inverted orientation. As should be apparent, this change provides for the user to fly the aircraft to a landing without having to reverse the operation of some control surfaces when the aircraft becomes inverted.

A fourth of the aircraft system operational changes in response to inverted flight pertains to the ailerons. During upright flight, in response to roll inputs from the manual controller 205, the station control system 305 generates communication signals 209 to the aircraft control system 303, which in turn controls the one or more ailerons 127 under typical and known flight protocols for aircraft ailerons. When the aircraft transitions to inverted flight, the system control system 301 (either in the aircraft control system 303 or the station control system 305) alters the control of the ailerons to automatically deflect the trailing edge of both of the ailerons toward the upper surface of the wing (i.e., gravitationally downward in the inverted orientation) to effectively operate as flaps 439, i.e., they operate as flaperons that are extended as an inverted flight flap. It should be recognized that while flaperons are known, it is not known for a control surface to operate a flaperon as an inverted flap when an aircraft becomes inverted.

This change in aileron operation may be accomplished based upon the generation or receipt of a communication signal 209 indicating the auto-land button 211 has been activated (and/or the auto-land function has been activated), or in response to a direct sensing that the aircraft is in the inverted orientation. As should be apparent, this change provides for the aircraft to better prepare for a controlled landing without further input by the user.

A fifth of the aircraft system operational changes in response to inverted flight pertains to propeller operation. During upright flight the aircraft control system 303 operates the propeller 135 to provide thrust that propels the aircraft. When the auto-land function is activated (and the aircraft transitions to inverted flight), the system control system 301 is configured to stop the rotation of the propeller 441 in preparation for landing. Moreover, the system control system is configured to establish and maintain the propeller in a safe mode, i.e., a substantially horizontal orientation (i.e., normal to a vertical gravitational direction when the aircraft is in the inverted orientation).

This change in operation of the propeller may be accomplished based upon the generation or receipt of a communication signal indicating the auto-land button has been activated (and/or the auto-land function has been activated), or in response to a direct sensing that the aircraft is in the inverted orientation. Moreover, it may be done instantaneously, or it may be delayed. The delay may be based upon the aircraft inversion maneuver being completed, upon the passage of a limited period of transition time, and/or on the elevation of the aircraft above the ground. As should be apparent, this change provides for the propeller to be safely oriented with respect to the ground prior to landing, thereby limiting the risk of propeller damage during landing, without requiring any further user input.

In a sixth of the aircraft system operational changes in response to inverted flight, when the auto-land button 211 is activated (i.e., selected, either manually or electronically) (and/or the auto-land function is activated) and the aircraft transitions to inverted flight, a stall initiation system is activated. The system control system 301 includes the stall initiation system, which is configured to adjust the elevator such that the inverted aircraft pitches its nose upward (with respect to gravity) to an such extent that the wing is at least partially stalled, and perhaps be in deep stall, while flying in the inverted orientation.

This change in operation of the propeller may be accomplished based upon the generation or receipt of a communication signal indicating the auto-land button has been activated (and/or the auto-land function has been activated) and that the aircraft has completed its control surface sequence to invert the aircraft, or in response to a direct sensing that the aircraft is in the inverted orientation. Moreover, it may be done instantaneously, or it may be delayed. The delay may be based upon the aircraft inversion maneuver being completed, upon the passage of a limited period of transition time, on the identification of a landing target that is properly positioned for a steep landing approach. This change provides for the stalled aircraft 417 to steeply descend 419 (see, FIGS. 8 & 9) to the ground while still having some lift to limit and control the descent using the elevator 115 and rudder 117.

In a seventh of the aircraft system operational changes in response to inverted flight, when the auto-land button is activated 445 (and/or the auto land function was activated) and the aircraft transitions to inverted and stalled flight, the system control system operates an active targeting system that adjusts the elevator and rudder such that the inverted and stalled aircraft descends to a target landing location. More particularly, the elevator is controlled to control the depth (i.e., extent) of the wing stall, and thus the angle of descent. Additionally, the rudder is controlled to control the direction of the descent. It should be noted that the identification of a target landing location can be based on a variety of cues, such as GPS coordinates, visual references and/or the identification of a target landing location by a user using one or more of the various cameras of the aircraft.

The system control system may be further configured for the user to manually override the control of the control surfaces using the controller. Alternatively, the system control system could lack an active targeting system, and the user could be responsible for manually guiding the aircraft to the target landing location.

In an eighth of the aircraft system operational changes, an absolute altitude determination system within the system control system is activated 447 for use in the inverted and stalled flight. The measurement of true altitude (i.e., above mean sea level) is well known for aircraft. During flight over terrain that is not well known, the absolute altitude (i.e., the altitude above ground level, a.k.a. the height) might not be known even though the true altitude is known. The system is configured to calculate absolute altitude for an aircraft that is changing altitudes.

The absolute altitude determination system will include a rate of true altitude change system (e.g., a rate of descent system) that calculates/estimates the rate of true altitude change using air pressure or other known methods of altitude change measurement. The absolute altitude determination system is further configured to monitor a real-time image of a fixed-size object on the ground, and measure its rate of change (i.e., using a camera to repeatedly image the fixed-size feature, and calculating an imaged size of the feature, such as by measuring the proportion of the image filled by the feature). The closer the aircraft is to the ground, the faster the image will change for a given rate of descent (or ascent), so the system calculates a rate of change in the imaged size (over time). The absolute altitude determination system calculates/estimates the (absolute) altitude above the ground using a rate of change of the monitored ground image and the estimated rate of change in the true altitude, such as by geometrical calculations that are within the skill in the art. Advantageously, this may provide for better control over the landing site of the aircraft, regardless of whether the aircraft is being controlled by an active targeting system or the user.

It should be noted that the timing of any of these operational changes, individually or combination, may be based upon or altered by additional user signals. For example, prior to activating the auto-land button, the user could be allowed to adjust a delay time for the stall until reaching a certain altitude, or until the user activates the auto-land button a second time.

Methods of Operating the Aircraft

While the aircraft system preferably includes some or all of the above-identified features, it should be noted that a skilled user can conduct methods of the invention without the use of a control system that extensively simplifies the landing process. Moreover, if the aircraft system does include some or all of the control system features, the user conducts the various methods of the invention by initiating the actions taken by the control system (e.g., by activating the auto-land button or otherwise causing the auto-land function to be activated).

Figure 12:
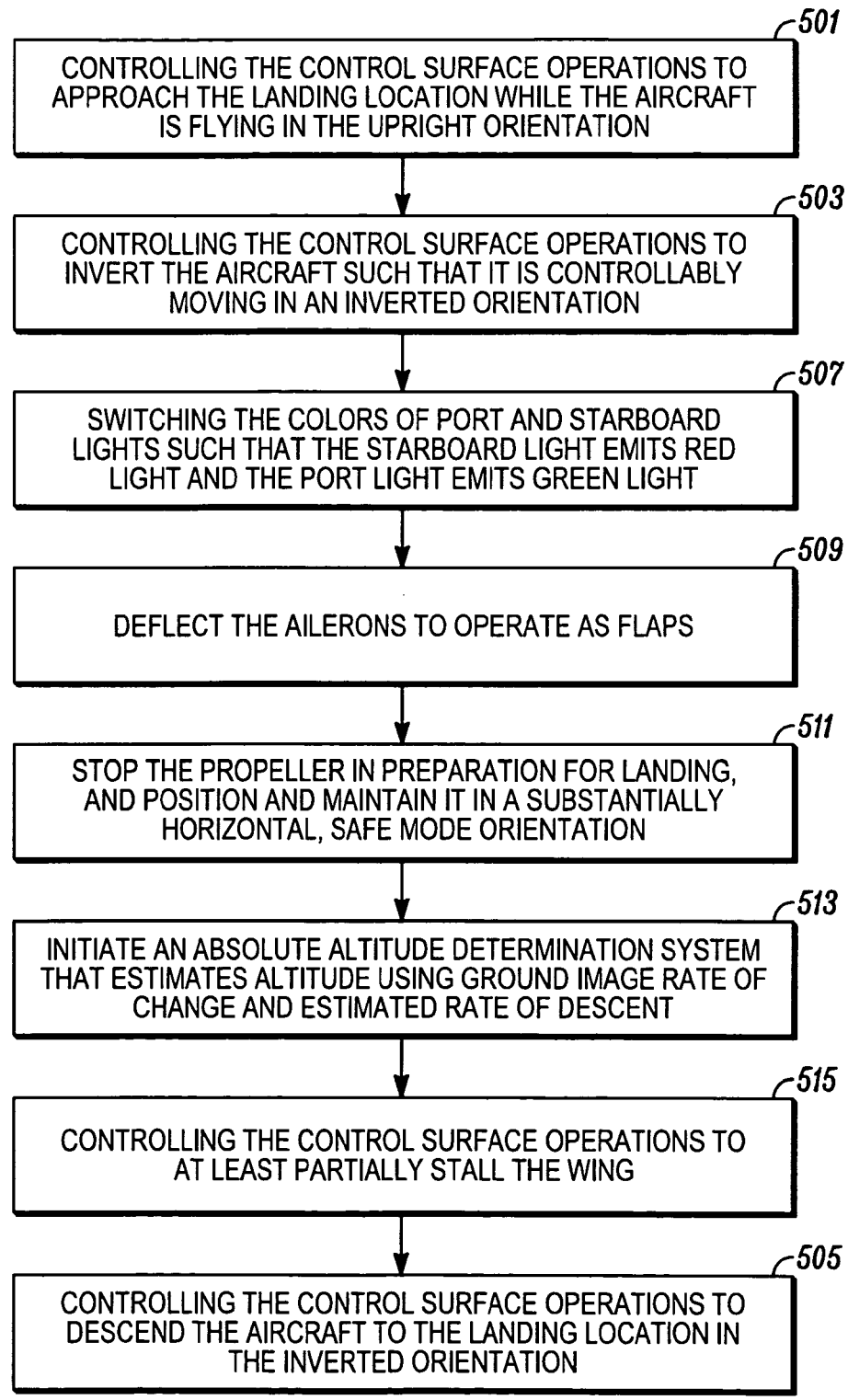
FIG. 12 is a schematic view of a method embodying the present invention.

With reference to FIG. 12, a user may conduct a method of landing an aircraft at a location for landing. As previously described, the aircraft has a wing including an upper surface and a lower surface defining an upright orientation for normal aircraft flight, and an inverted orientation for inverted flight. The upper surface is gravitationally above the lower surface while in the upright orientation, and the lower surface is gravitationally above the upper surface while in the inverted orientation.

The method includes the steps of: (a) controlling the operation of one or more control surfaces to approach the landing location while the aircraft is flying in the upright orientation 501; (b) controlling the operation of the one or more control surfaces to invert the aircraft such that it is controllably moving in an inverted orientation 503; and (c) controlling the operation of the one or more control surfaces to descend the aircraft to the landing location in the inverted orientation 505.

Under this method, a downward facing payload can be protected from the high impact loads that are possible from a direct impact with the ground. Nevertheless, some flight control is maintained such that the landing location can be controlled in flight conditions characterized by unknown or changing wind speeds and/or directions. Moreover, this allows a user of relatively limited skill or experience from having to commit to a landing attempt at a high altitude without any ability to adjust for mistakes.

Generally, the aircraft will be an unmanned aircraft, and the steps are conducted by a user operating a remote-control station configured for remotely controlling the operation of the one or more control surfaces. Typically, as was described above, the aircraft will include a first, upright-orientation camera oriented to view downward and forward while the aircraft is in the upright orientation, and a second, inverted-orientation camera oriented to view downward and forward while the aircraft is in the inverted orientation. On the remote-control station, the user observes images from the first camera while flying in the upright orientation, and from the second camera while flying in the inverted orientation.

While any of a variety of maneuvers may be used to invert the aircraft in step (b), it is anticipated that two advantageous maneuvers are to operate the one or more control surfaces (e.g., the ailerons) to roll the aircraft into the inverted orientation, and to operate the one or more control surfaces (e.g., the elevators) to pitch the aircraft into the inverted orientation. The roll maneuver provides for the aircraft to be in substantially the same location, and traveling in substantially the same direction after the maneuver is completed. This simplifies the user experience, as the ground image remains unchanged when the aircraft switches from the upright-orientation camera to the inverted-orientation camera (assuming the aircraft is using such cameras).

The pitch maneuver provides for the aircraft to be traveling in the opposite direction, and might be accompanied by a significant change in true altitude. Moreover, the change in direction of travel will cause an inversion of the ground view from the aircraft (and on the remote-control station display). Nevertheless, this maneuver might be preferable in situations where the aircraft is traveling back from and landing close to dangerous airspace, such as to a user on a battlefield or close to a burning building.

The aircraft may include a starboard light emitting a first color (e.g., green) on a starboard side of the wing and a port light emitting a second color (e.g., red) on a port side of the wing. The method of this embodiment may also include the switching of the colors such that the starboard light emits the second color (e.g., red) and the port light emits the first color (e.g., green). This switching may be manually and individually initiated by a user, or may be an automated process in response to some other condition controlled by the user.

Optionally, the user may manually and individually initiate a change in the operation of ailerons such that they become flaperons in the inverted orientation, i.e., the ailerons deflect to operate as flaps 509. This switching may be manually and individually initiated by a user, or may be an automated process in response to some other condition controlled by the user.

Additionally, the user may stow the propeller, i.e., stop the rotation of the propeller in preparation for landing, and have it positioned and maintained in a substantially horizontal, safe mode orientation 511 (i.e., normal to a vertical gravitational direction when the aircraft is in the inverted orientation). This propeller control may be manually and individually initiated by a user, or may be an automated process in response to some other condition controlled by the user.

Furthermore, the user may initiate an absolute altitude determination system that determines the absolute altitude of the aircraft as it descends, and optionally displays the altitude on the remote-control station for use by the user. The absolute altitude determination system calculates an estimated altitude above the ground using a rate of change of a monitored ground image and an estimated rate of descent 513. This altitude determination system control may be manually and individually initiated by a user, or may be an automated process in response to some other condition controlled by the user.

In landing the aircraft at the landing location, the user may control the operation of one or more control surfaces to at least partially stall the wing 515 while the aircraft is in the inverted orientation to provide for the aircraft to rapidly descend. The user may further control the rate of the descent of the aircraft by controlling depth of the wing stall. In at least some cases, a deep stall will be desirable. During descent, the direction of the decent may be controlled by controlling the rudder.

Optionally, some or all of these functions that may be initiated by the user by activating one or more buttons (on the remote-control station) that initiate the system control system to activate/conduct these features and functions, including the operation of the control surfaces to invert the aircraft, the changing of the light colors, the use of inverted flaperons, the stowing of the propeller, the activation of the altitude determination system, the stalling of the wing, and the controlling of the rate of descent and direction of descent. The button(s) may instruct the aircraft control system to automatically conduct an inverting maneuver in which the aircraft rotates from the upright orientation to the inverted orientation, change the colors of the landing lights, extend the elevators as flaperons, stow the propeller, activate of the altitude determination system, stall the wing, and/or control of the rate of descent and/or direction of descent in any variation of combinations.

It is to be understood that the invention comprises apparatus and methods for landing an aircraft, and for producing and selling aircraft, as well as the apparatus and methods of the aircraft itself. Alternate variations of these embodiments could comprise other types of aerial vehicles. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. An unmanned aircraft system, comprising:
    an aircraft including a wing having an upper surface and a lower surface defining an upright orientation for normal aircraft flight and an inverted orientation for inverted flight, the upper surface being gravitationally above the lower surface while in the upright orientation, and the lower surface being gravitationally above the upper surface while in the inverted orientation;
    a remote-control station;
    a remote-control control system configured for a user to remotely control the flight of the aircraft using the remote-control station;
    a first camera oriented to view downward and forward while the aircraft is in the upright orientation; and
    a second camera oriented to view downward and forward while the aircraft is in the inverted orientation;
    wherein the remote-control station is provided with an auto-land function that instructs the control system to operate the control surfaces such that the aircraft conducts an inverting maneuver in which the aircraft rotates from the upright orientation to the inverted orientation; and
    wherein the control system is configured to relay images from the first camera to the remote-control station while the aircraft is in the upright orientation, and to relay images from the second camera to the remote-control station while the aircraft is in the inverted orientation, and wherein the remote-control station is configured to display the relayed images from the first camera to the user during flight in the upright orientation, and is further configured to display the relayed images from the second camera to the user during flight in the inverted orientation.

2. The unmanned aircraft system of claim 1, and further comprising a starboard light on a starboard side of the wing and a port light on a port side of the wing, wherein the control system is configured to control the color of the starboard and port lights such that the starboard light emits a first color and the port light emits a second color while the aircraft is in the upright orientation, and such that the starboard light emits the second color and the port light emits the first color while the aircraft is in the inverted orientation.

3. The unmanned aircraft system of claim 1, wherein the aircraft is configured with ailerons, and wherein the control system is configured to automatically deflect the ailerons to operate as flaps when the aircraft rotates from the upright orientation to the inverted orientation.

4. The unmanned aircraft system of claim 1, and further comprising a payload extending gravitationally below the wing while the aircraft is in the upright orientation.

5. The unmanned aircraft system of claim 1, and further comprising landing gear, wherein the landing gear is located above the wing and positioned for landing in the inverted orientation.

6. The unmanned aircraft system of claim 5, wherein the landing gear is an expanded polypropylene pad located above the wing when the aircraft is in the upright orientation.

7. An unmanned aircraft system, comprising:
an aircraft including a wing having an upper surface and a lower surface defining an upright orientation for normal aircraft flight and an inverted orientation for inverted flight, the upper surface being gravitationally above the lower surface while in the upright orientation, and the lower surface being gravitationally above the upper surface while in the inverted orientation;
a remote-control station;
a remote-control control system configured for a user to remotely control the flight of the aircraft using the remote-control station; and
a set of one or more control surfaces configured to control the flight of the aircraft;
wherein the remote-control station is provided with an auto-land function that instructs the control system to operate the control surfaces such that the aircraft conducts an inverting maneuver in which the aircraft rotates from the upright orientation to the inverted orientation;
wherein the remote-control station is configured with a controller that generates signals to control the one or more control surfaces; and
wherein the control system is configured to adapt the control signals such that a user of the controller does not need to adapt use of the controller based on the orientation of the aircraft.

8. An unmanned aircraft system, comprising:
an aircraft including a wing having an upper surface and a lower surface defining an upright orientation for normal aircraft flight and an inverted orientation for inverted flight, the upper surface being gravitationally above the lower surface while in the upright orientation, and the lower surface being gravitationally above the upper surface while in the inverted orientation;
a remote-control station;
a remote-control control system configured for a user to remotely control the flight of the aircraft using the remote-control station; and
a fuselage and an empennage, the empennage including a rudder that extends vertically downward below the fuselage while the aircraft is in the upright orientations;
wherein the remote-control station is provided with an auto-land function that instructs the control system to operate the control surfaces such that the aircraft conducts an inverting maneuver in which the aircraft rotates from the upright orientation to the inverted orientation.

9. A method of landing an aircraft at a location for landing, the aircraft having a wing including an upper surface and a lower surface defining an upright orientation for normal aircraft flight, and an inverted orientation for inverted flight, the upper surface being gravitationally above the lower surface while in the upright orientation, and the lower surface being gravitationally above the upper surface while in the inverted orientation, comprising:
(a) controlling the operation of one or more control surfaces to approach the landing location while the aircraft is flying in the upright orientation;
(b) controlling the operation of the one or more control surfaces to invert the aircraft such that it is controllably moving in an inverted orientation; and
(c) controlling the operation of the one or more control surfaces to descend the aircraft to the landing location in the inverted orientation
wherein the aircraft is an unmanned aircraft;
wherein in steps (a), (b) and (c), a user operates a remote-control station configured for remotely controlling the operation of the one or more control surfaces;
wherein the aircraft includes a first camera oriented to view downward and forward while the aircraft is in the upright orientation, and a second camera oriented to view downward and forward while the aircraft is in the inverted orientation;
wherein step (a) includes the step of observing images from the first camera on the remote-control station; and
wherein step (c) includes the step of observing images from the second camera on the remote-control station.

10. The method of claim 9, wherein step (b) includes controlling the operation of the one or more control surfaces to roll into the inverted orientation.

11. The method of claim 9, wherein step (b) includes controlling the operation of the one or more control surfaces to pitch into the inverted orientation.

12. The method of claim 9, wherein step (b) comprises activating an auto-land function that instructs the control system to automatically conduct an inverting maneuver in which the aircraft rotates from the upright orientation to the inverted orientation.

13. The method of claim 9, wherein the aircraft includes a starboard light emitting a first color on a starboard side of the wing and a port light emitting a second color on a port side of the wing, and wherein step (b) comprises changing the colors of the lights such that the starboard light emits the second color and the port light emits the first color.

14. The method of claim 9, wherein the one or more control surfaces include one or more ailerons, and wherein step (c) includes deflecting the ailerons to operate as flaps.

15. A method for a user to operate an unmanned aircraft from a remote control station with a viewer, the aircraft having a wing including an upper surface and a lower surface defining an upright orientation for normal aircraft flight, and an inverted orientation for inverted flight, the upper surface being gravitationally above the lower surface while in the upright orientation, and the lower surface being gravitationally above the upper surface while in the inverted orientation, comprising:
(a) controlling the operation of one or more control surfaces to controllably fly the aircraft in the upright orientation while displaying images on the viewer from a first aircraft camera oriented to view downward and forward while the aircraft is in the upright orientation;
(b) controlling the operation of the one or more control surfaces to invert the aircraft; and
(c) controlling the operation of one or more control surfaces to controllably fly the aircraft in the inverted orientation while displaying images on the viewer from a second aircraft camera oriented to view downward and forward while the aircraft is in the inverted orientation.

* * * * *